United States Patent
Dasari et al.

(10) Patent No.: US 9,684,640 B2
(45) Date of Patent: *Jun. 20, 2017

(54) METHODS AND APPARATUS FOR PROCESSING MARKUP LANGUAGE DOCUMENTS

(71) Applicant: American Express Travel Related Services Company, Inc., New York, NY (US)

(72) Inventors: Srinivas Dasari, Scottsdale, AZ (US); Kevin T. Harvey, Phoenix, AZ (US); Cathy Sockrider, Peoria, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 697 days.

This patent is subject to a terminal disclaimer.

(21) Appl. No.: 14/170,442

(22) Filed: Jan. 31, 2014

(65) Prior Publication Data

US 2014/0149849 A1    May 29, 2014

Related U.S. Application Data

(63) Continuation of application No. 10/906,018, filed on Jan. 31, 2005, now Pat. No. 8,683,318.

(Continued)

(51) Int. Cl.
*G06F 17/00* (2006.01)
*G06F 17/22* (2006.01)
*G06F 9/44* (2006.01)

(52) U.S. Cl.
CPC .............. *G06F 17/2264* (2013.01); *G06F 8/30* (2013.01)

(58) Field of Classification Search
CPC ............................. G06F 17/2264; G06F 8/30
See application file for complete search history.

(56) References Cited

U.S. PATENT DOCUMENTS 5,428,773 A * 6/1995 Berkovich ........ G06F 17/30982
5,450,536 A * 9/1995 Rosenberg ............ G06F 17/245
715/236

(Continued)

OTHER PUBLICATIONS

IBM, "IBM Enterprise COBOL for z/OS Programming Guide", Version 3, Release 3, Third Edition, published Feb. 2004, 800 pages.*
W3C, "Introduction to XML Schema", W3C, published Feb. 14, 2002, p. 1-2 + wayback page (3 pgs. total). http://web.archive.org/web/20020214225603/http://www.w3schools.com/schema/schema_intro.asp.

(Continued)

*Primary Examiner* — Cesar Paula
*Assistant Examiner* — David Faber
(74) *Attorney, Agent, or Firm* — Snell & Wilmer, L.L.P.

(57) ABSTRACT

A method for facilitating the processing of markup language documents, e.g., XML documents, uses a code generator that creates programs configured to read dynamic XML documents at run time, avoiding many of the complexities arising from the use of conventional "XML Parse" statements. In one embodiment, this process involves (1) creating a template document using the markup language, wherein the template document includes a set of tags associated with the markup language documents; (2) parsing the template document to determine a data structure corresponding to the tags in the template document; and (3) generating an application program in the programming language (e.g., COBOL), wherein the application program includes a definition of the data structure, and is configured to read, during run-time, the markup language document and generate a corresponding set of data elements corresponding to the data structure.

19 Claims, 13 Drawing Sheets

Related U.S. Application Data (60) Provisional application No. 60/587,701, filed on Jul. 14, 2004.

(56) References Cited

U.S. PATENT DOCUMENTS

| | | | | |
|---|---|---|---|---|
| 5,544,360 | A | * | 8/1996 | Lewak ............. G06F 17/30126 |
| 5,715,441 | A | * | 2/1998 | Atkinson ............. G06F 3/0605 |
| | | | | 707/700 |
| 6,009,267 | A | * | 12/1999 | Ogawa .................. G06F 8/70 |
| | | | | 717/101 |
| 6,539,541 | B1 | * | 3/2003 | Geva .................... G06F 8/443 |
| | | | | 712/233 |
| 6,642,945 | B1 | * | 11/2003 | Sharpe ............. G06F 17/30905 |
| | | | | 345/156 |
| 6,687,873 | B1 | | 2/2004 | Ballantyne et al. |
| 6,825,849 | B1 | * | 11/2004 | Minakuchi ............ G06F 17/214 |
| | | | | 345/581 |
| 6,874,010 | B1 | * | 3/2005 | Sargent ............. G06F 17/30864 |
| | | | | 707/E17.108 |
| 6,915,487 | B2 | | 7/2005 | Costigan et al. |
| 6,947,945 | B1 | | 9/2005 | Carey et al. |
| 6,985,910 | B2 | | 1/2006 | Hollingsworth |
| 7,114,147 | B2 | | 9/2006 | Ballantyne et al. |
| 7,114,148 | B2 | | 9/2006 | Irving et al. |
| 7,117,504 | B2 | | 10/2006 | Smith et al. |
| 7,174,327 | B2 | | 2/2007 | Chau et al. |
| 7,342,897 | B1 | * | 3/2008 | Nader ................ H04L 12/2602 |
| | | | | 370/241 |
| 7,546,527 | B2 | * | 6/2009 | Dames ............... G06F 17/2247 |
| | | | | 715/234 |
| 8,055,999 | B2 | * | 11/2011 | Dames ............... G06F 17/2247 |
| | | | | 715/234 |
| 2001/0044811 | A1 | * | 11/2001 | Ballantyne ............. G06F 8/30 |
| | | | | 717/107 |
| 2002/0107881 | A1 | * | 8/2002 | Patel ....................... H03M 7/30 |
| | | | | 715/273 |
| 2002/0143816 | A1 | | 10/2002 | Geiger et al. |
| 2002/0194338 | A1 | * | 12/2002 | Elving .................... H04L 29/06 |
| | | | | 709/226 |
| 2003/0005410 | A1 | * | 1/2003 | Harless .................... G06F 8/30 |
| | | | | 717/114 |
| 2004/0148612 | A1 | * | 7/2004 | Olsen ...................... G06F 8/30 |
| | | | | 719/328 |
| 2004/0168124 | A1 | * | 8/2004 | Beisiegel ............ G06F 17/2247 |
| | | | | 715/234 |
| 2004/0221292 | A1 | | 11/2004 | Chiang et al. |
| 2005/0138606 | A1 | | 6/2005 | Basu et al. |
| 2005/0155016 | A1 | | 7/2005 | Bender et al. |

OTHER PUBLICATIONS

Kjell, "Chapter 47—Common Array Algorithms", Central Connecticut State University, latest revision of publication on May 27, 2003, pp. 1-7, http://kiv.zcu.cz/~ledvina/vyuka/Java/javanotes/Notes/chap47/ch47_1.html.

Kjell, "Introduction to Computer Science using Java", Central Connecticut State University, Jul. 2003, pp. 1-2, http://www.kiv.zcu.cz/~ledvina/vyuka/Java/javanotes/cs151java.html.

IBM, "IBM Enterprise COBOL for z/OS Language Reference", Version 3, Release 3, Third Edition, published Feb. 2004, pp. 229-455.

USPTO; Notice of Allowance and Fee(s) Due dated Nov. 6, 2013 in U.S. Appl. No. 10/906,018.

USPTO; Office Action dated Apr. 11, 2013 in U.S. Appl. No. 10/906,018.

USPTO; Office Action dated Sep. 12, 2011 in U.S. Appl. No. 10/906,018.

USPTO; Office Action dated Aug. 19, 2010 in U.S. Appl. No. 10/906,018.

USPTO; Office Action dated Jun. 8, 2009 in U.S. Appl. No. 10/906,018.

USPTO; Office Action dated Jul. 8, 2008 in U.S. Appl. No. 10/906,018.

USPTO; Office Action dated Jul. 26, 2007 in U.S. Appl. No. 10/906,018.

USPTO; Final Rejection Office Action dated Dec. 27, 2011 in U.S. Appl. No. 10/906,018.

USPTO; Final Rejection Office Action dated Nov. 26, 2010 in U.S. Appl. No. 10/906,018.

USPTO; Final Rejection Office Action dated Jan. 6, 2010 in U.S. Appl. No. 10/906,018.

USPTO; Final Rejection Office Action dated Nov. 28, 2008 in U.S. Appl. No. 10/906,018.

USPTO; Advisory Action dated Feb. 17, 2012 in U.S. Appl. No. 10/906,018.

USPTO; Advisory Action dated Feb. 9, 2011 in U.S. Appl. No. 10/906,018.

USPTO; Advisory Action dated Apr. 5, 2010 in U.S. Appl. No. 10/906,018.

USPTO; Advisory Action dated Mar. 18, 2009 in U.S. Appl. No. 10/906,018.

USPTO; Advisory Action dated Apr. 17, 2008 in U.S. Appl. No. 10/906,018.

USPTO; Final Rejection Office Action dated Nov. 27, 2007 in U.S. Appl. No. 10/906,018.

* cited by examiner

```
PROCEDURE DIVISION USING LS-XML-IN-REC,
                       LS-COBOL-IN-BODY.
```

FIG. 7

```
XML PARSE LS-XML-IN-AREA
          PROCESSING PROCEDURE 3100-XML-PARSE THRU 3100-EXIT
    ON EXCEPTION
        MOVE XML-CODE  TO   LS-XML-READ-RETURN-CODE
        NOT ON EXCEPTION
        MOVE ZEROS     TO   LS-XML-READ-RETURN-CODE
        END-XML.
```

FIG. 8

```
IF     W300-CURR-FIELD-NAME    =   'MEMOINFO'
            AND W300-FIELD-NAME(1)    =   'DOCUMENT'
            AND W300-FIELD-NAME(2)    =   'BODY'
            AND W300-FIELD-NAME(3)    =   'ACCTINFO'
            AND W300-FIELD-NAME(4)    =   ' '
                IF W300-CURR-FIELD-NAME =
                   W300-PREV-FIELD-NAME
                    ADD   1   TO   WS-1
                ELSE
                    MOVE 1   TO   WS-1
                END-IF
       END-IF.
```

FIG. 9

```
IF    W300-CURR-FIELD-NAME  =  'MEMOTEXT'
  AND W300-FIELD-NAME(1)   =  'DOCUMENT'
  AND W300-FIELD-NAME(2)   =  'BODY'
  AND W300-FIELD-NAME(3)   =  'ACCTINFO'
  AND W300-FIELD-NAME(4)   =  'MEMOINFO'
      COMPUTE WS-LEN =
                FUNCTION LENGTH(XML-TEXT)
      IF WS-LEN > 0 AND XML-TEXT > SPACES
         MOVE XML-TEXT(1:WS-LEN)   TO
            LS-XML-MEMOTEXT
              OF LS-GRP-MEMOTEXT
              OF LS-GRP-MEMOINFO
              OF LS-GRP-ACCTINFO
              OF LS-GRP-BODY
              OF LS-GRP-DOCUMENT
              OF LS-XML-IN-BODY( WS-1 ) (WS-F-LOC:WS-LEN)
          ADD WS-LEN TO   WS-F-LOC
      END-IF
      GO TO 3300-EXIT
 END-IF.

IF  current tag =   'MemoTxt'
     AND Prev Tag (1) = 'Document'
     AND Prev Tag (2) = 'Body'
     AND Prev Tag (3) = 'AcctInfo'
     AND Prev Tag (4) = 'MemoInfo'
Then
     Move the content characters into the corresponding fixed
     format field in the linkage section ( This could be
     LS-XML-MEMOTXT(ws-i) )
```

FIG. 10

```
<?xml version="1.0" encoding="UTF-8"?>
<Document>
<Body>
 <AcctInfo>
  <AcctNo>457561</AcctNo>
  <MemoInfo>
  <MemoNo>001</MemoNo>
    <MemoText><![CDATA[&%$#@ test memo1]]></MemoText>
  </MemoInfo>
  <MemoInfo>
  <MemoNo>002</MemoNo>
    <MemoText><![CDATA[&%$#@ test memo2]]></MemoText>
  </MemoInfo>
  <MemoInfo>
  <McmoNo>003</MemoNo>
    <MemoText><![CDATA[&%$#@ test memo3]]></MemoText>
  </MemoInfo>
 </AcctInfo>
</Body>
</Document>
```

FIG. 11

```
LINKAGE SECTION.
   01 LS-XML-IN-BODY.
      05            LS-GRP-DOCUMENT.
       10           LS-GRP-BODY.
        15          LS-GRP-ACCTINFO.
         20         LS-GRP-ACCTNO.
          25        LS-XML-ACCTNO              PIC X(006).
         20         LS-GRP-MEMOINFO OCCURS 3.
          25        LS-GRP-MEMONO.
           30       LS-XML-MEMONO              PIC X(003).
          25        LS-GRP-MEMOTEXT.
           30       LS-XML-MEMOTEXT            PIC X(016).
   01 LS-XML-IN-REC.
      05   LS-XML-IN-LENGTH                    PIC S9(07) COMP.
      05   LS-XML-IN-AREA.
           10   LS-XML-IN-CHAR   OCCURS 1 TO 32000
                      DEPENDING ON LS-XML-IN-LENGTH PIC X.
```

FIG. 12

```
PROCEDURE DIVISION USING LS-XML-IN-REC,
               LS-COBOL-IN-BODY.
   0000-MAIN.

MOVE 0 TO W300-LEVEL-NO.
      MOVE '00' TO LS-XML-READ-RETURN-CODE.
      MOVE SPACES TO W300-PREV-FIELD-NAME.
      XML PARSE LS-XML-IN-AREA
        PROCESSING PROCEDURE 3100-XML-PARSE THRU 3100-EXIT
        ON EXCEPTION
          MOVE XML-CODE TO LS-XML-READ-RETURN-CODE
        NOT ON EXCEPTION
          MOVE ZEROS   TO LS-XML-READ-RETURN-CODE
      END-XML.

GOBACK.

3100-XML-PARSE.
      IF XML-EVENT = 'START-OF-ELEMENT'
        MOVE XML-TEXT TO W300-HOLD-NAME
        MOVE FUNCTION UPPER-CASE(W300-HOLD-NAME)
              TO W300-CURR-FIELD-NAME
        IF W300-CURR-FIELD-NAME = 'ENVELOPE'
          MOVE 'YES' TO W300-BODY-FOUND
        END-IF
      ELSE
      IF XML-EVENT = 'EXCEPTION'
        IF (XML-CODE > 49 AND XML-CODE < 100 ) OR
           (XML-CODE > 299 AND XML-CODE < 500 )
          DISPLAY 'XML EVENT:' XML-EVENT '3'
          DISPLAY 'XML TEXT :' XML-TEXT '3'
          MOVE 0 TO XML-CODE
        END-IF
      END-IF.

IF W300-BODY-FOUND NOT = 'YES'
        GO TO 3100-EXIT
      END-IF.

EVALUATE XML-EVENT

* ALL THESE EVENTS ARE IGNORED. IF ANY OF THE EVENTS ARE REQUIRED
* THE USER OF THE API HAS TO MODIFY THIS TO INTERCEPT THE
* EVENT AND TAKE APPROPRIATE ACTION.
           WHEN 'VERSION-INFORMATION'
```

FIG. 13A

```
WHEN 'ENCODING-DECLARATION'
WHEN 'START-OF-DOCUMENT'
WHEN 'STANDALONE-DECLARATION'
WHEN 'DOCUMENT-TYPE-DECLARATION'
WHEN 'COMMENT'
WHEN 'PROCESSING-INSTRUCTION-TARGET'
WHEN 'PROCESSING-INSTRUCTION-DATA'
WHEN 'START-OF-CDATA-SECTION'
WHEN 'END-OF-CDATA-SECTION'
WHEN 'END-OF-DOCUMENT'
   CONTINUE
WHEN 'START-OF-ELEMENT'
   ADD 1 TO W300-LEVEL-NO
   PERFORM 3400-INCREMENT-ARRAY
      THRU 3400-EXIT
   MOVE W300-CURR-FIELD-NAME
        TO W300-FIELD-NAME(W300-LEVEL-NO)
   MOVE 1 TO WS-F-LOC
WHEN 'ATTRIBUTE-NAME'
   MOVE XML-TEXT TO W300-HOLD-NAME
   MOVE FUNCTION UPPER-CASE(W300-HOLD-NAME)
        TO W300-ATTRIBUTE-NAME
   MOVE 1 TO WS-A-LOC
WHEN 'ATTRIBUTE-CHARACTERS'
WHEN 'ATTRIBUTE-CHARACTER'
   PERFORM 3200-PROCESS-ATTRIBUTE
      THRU 3200-EXIT
WHEN 'END-OF-ELEMENT'
   MOVE SPACES TO W300-FIELD-NAME (W300-LEVEL-NO)
   SUBTRACT 1 FROM W300-LEVEL-NO
   MOVE XML-TEXT TO W300-HOLD-NAME
   MOVE FUNCTION UPPER-CASE(W300-HOLD-NAME)
        TO W300-PREV-FIELD-NAME
   IF W300-PREV-FIELD-NAME = 'ENVELOPE'
     MOVE -1 TO XML-CODE
   END-IF
WHEN 'CONTENT-CHARACTERS'
WHEN 'CONTENT-CHARACTER'
   PERFORM 3300-PROCESS-CONTENT
      THRU 3300-EXIT
WHEN 'EXCEPTION'
   CONTINUE
WHEN OTHER
   CONTINUE
END-EVALUATE.
```

FIG. 13B

```
3100-EXIT.
  EXIT.
3200-PROCESS-ATTRIBUTE.
* there are no attributes in this xml **
3200-EXIT.
  EXIT.
3300-PROCESS-CONTENT.
  IF W300-CURR-FIELD-NAME = 'ACCTNO'
  AND W300-FIELD-NAME(1) = 'DOCUMENT'
  AND W300-FIELD-NAME(2) = 'BODY'
  AND W300-FIELD-NAME(3) = 'ACCTINFO'
  AND W300-FIELD-NAME(4) = 'ACCTNO'
    COMPUTE WS-LEN =
      FUNCTION LENGTH(XML-TEXT)
    IF WS-LEN > 0 AND XML-TEXT > SPACES
      MOVE XML-TEXT(1:WS-LEN) TO
        LS-XML-ACCTNO
      OF LS-GRP-ACCTNO
      OF LS-GRP-ACCTINFO
      OF LS-GRP-BODY
      OF LS-GRP-DOCUMENT
      OF LS-XML-IN-BODY (WS-F-LOC:WS-LEN)
      ADD WS-LEN TO WS-F-LOC
    END-IF
    GO TO 3300-EXIT
  END-IF.
*
  IF W300-CURR-FIELD-NAME = 'MEMONO'
  AND W300-FIELD-NAME(1) = 'DOCUMENT'
  AND W300-FIELD-NAME(2) = 'BODY'
  AND W300-FIELD-NAME(3) = 'ACCTINFO'
  AND W300-FIELD-NAME(4) = 'MEMOINFO'
  AND W300-FIELD-NAME(5) = 'MEMONO'
    COMPUTE WS-LEN =
      FUNCTION LENGTH(XML-TEXT)
    IF WS-LEN > 0 AND XML-TEXT > SPACES
      MOVE XML-TEXT(1:WS-LEN) TO
        LS-XML-MEMONO
      OF LS-GRP-MEMONO
      OF LS-GRP-MEMOINFO
      OF LS-GRP-ACCTINFO
      OF LS-GRP-BODY
      OF LS-GRP-DOCUMENT
      OF LS-XML-IN-BODY( WS-1 ) (WS-F-LOC:WS-LEN)
      ADD WS-LEN TO WS-F-LOC
```

FIG. 13C

```
      END-IF
        GO TO 3300-EXIT
      END-IF.
    *
      IF W300-CURR-FIELD-NAME = 'MEMOTEXT'
      AND W300-FIELD-NAME(1) = 'DOCUMENT'
      AND W300-FIELD-NAME(2) = 'BODY'
      AND W300-FIELD-NAME(3) = 'ACCTINFO'
      AND W300-FIELD-NAME(4) = 'MEMOINFO'
      AND W300-FIELD-NAME(5) = 'MEMOTEXT'
        COMPUTE WS-LEN =
          FUNCTION LENGTH(XML-TEXT)
        IF WS-LEN > 0 AND XML-TEXT > SPACES
          MOVE XML-TEXT(1:WS-LEN) TO
            LS-XML-MEMOTEXT
          OF LS-GRP-MEMOTEXT
          OF LS-GRP-MEMOINFO
          OF LS-GRP-ACCTINFO
          OF LS-GRP-BODY
          OF LS-GRP-DOCUMENT
          OF LS-XML-IN-BODY( WS-1 ) (WS-F-LOC:WS-LEN)
          ADD WS-LEN TO WS-F-LOC
        END-IF
        GO TO 3300-EXIT
      END-IF.
    *
    3300-EXIT.
      EXIT.
    3400-INCREMENT-ARRAY.
      IF W300-CURR-FIELD-NAME = 'MEMOINFO'
      AND W300-FIELD-NAME(1)  = 'DOCUMENT'
      AND W300-FIELD-NAME(2)  = 'BODY'
      AND W300-FIELD-NAME(3)  = 'ACCTINFO'
      AND W300-FIELD-NAME(4)  = ' '
        IF W300-CURR-FIELD-NAME =
           W300-PREV-FIELD-NAME
          ADD 1 TO WS-1
        ELSE
          MOVE 1 TO WS-1
        END-IF
      END-IF.
    *
    3400-EXIT.
      EXIT.
```

FIG. 13D

METHODS AND APPARATUS FOR PROCESSING MARKUP LANGUAGE DOCUMENTS

CROSS REFERENCE TO RELATED APPLICATIONS

This application is a continuation of, claims priority to and the benefit of, U.S. Ser. No. 10/906,018 filed Jan. 31, 2005 and entitled "METHODS AND APPARATUS FOR PROCESSING MARKUP LANGUAGE DOCUMENTS." The '018 application claims priority to, and the benefit of, U.S. Provisional Application Ser. No. 60/587,701, filed Jul. 14, 2004, and entitled "System and Method to Facilitate Reading XML Documents in COBOL." Both of which are hereby incorporated by reference in their entirety.

FIELD OF THE INVENTION

The present invention generally relates to the reading and processing of markup-language documents (e.g., extensible markup language (XML) documents) using traditional procedural programming languages (e.g., COBOL and the like).

BACKGROUND OF THE INVENTION

Many organizations have discovered that the cost, effort, and risk required to replace older legacy systems with modern software and database systems are overwhelming. Rather, organizations continue to place an emphasis on supporting legacy systems by bridging gaps between old and new computing technologies, wherein bridging the gap often includes modification of existing legacy data and programming languages.

COBOL is one such programming language. Despite the existence of modern, object-oriented programming languages and Internet-based applications, COBOL will likely remain a vital part of many organizations' computing centers. Traditional COBOL, however, lacks some of the flexibility of modern languages, such as the ability to read extensible markup language (XML) documents.

XML resembles Hypertext Markup Language (HTML) in appearance and structure; however, XML is functionally different: HTML specifies how to display data, while XML is used to describe data. Accordingly, XML has provided developers with a means for displaying different types of data in a consistent manner. Generally, a developer may create formatting instructions within a data type definition (DTD) file. When a data type is defined, a developer need only add an XML tag within an HTML document which corresponds to a tag in the DTD.

Because COBOL is a legacy programming language, it must often be retrofitted to support various functionality relating to newer computing technologies. Technologies such as XML were not designed with older computing technologies such as COBOL in mind. Modifying the language or creating add-on products most often results in extra layers of sophistication and complexity for the developer. One such example is "XML PARSE," which is a function included within IBM® Enterprise COBOL. While XML PARSE provides an effective means to parse and process various types of XML, it may still present a formidable task for developers in that they must be aware of all of the events associated with the verb. Further, it typically requires the creation of complex COBOL structures that mimic XML data structures.

SUMMARY OF THE INVENTION

In general, the invention provides a method for facilitating the processing of markup language documents, e.g., XML documents, through the use of a code generator that creates programs configured to read dynamic XML documents at run time, while minimizing or avoiding many of the complexities arising from the use of conventional "XML Parse" statements. In one embodiment, this process involves (1) creating a template document using the markup language, wherein the template document includes a set of tags associated with the markup language documents; (2) parsing the template document to determine a data structure corresponding to the tags in the template document; and (3) generating an application program in the programming language (e.g., COBOL), wherein the application program includes a definition of the data structure, and is configured to read, during run-time, the markup language document and generate a corresponding set of data elements corresponding to the data structure.

In some organizations, the transformation of the XML message to a COBOL layout is performed on a middleware layer. This additional layer increases operating costs and response times. The manual creation of the transformation logic is labor-intensive and cumbersome and costly to maintain and modify. Implementing this invention may lower operating expenses over the middleware approach because it may save about 50% of the development cost, as the manually intensive transformation logic definition is avoided. The invention also reduces associated maintenance costs, as most of the maintenance and versioning of software is confined to the requester and provider; i.e., the additional layer is not present to be modified. Avoiding transformation on the middleware layer may effectively increase the capacity of the middleware server for other tasks by up to about 40%. The latency associated with the transformation is greatly reduced (up to about 75%) by this approach and improves the efficiency of processing for every message that has a COBOL process somewhere in its path. The invention also increases the quantity/quality and/or performance of existing services. The total throughput of messages between requester and provider can improve significantly (due to, for example, the latency reduction mentioned above) and may result in better system response and this in turn may lead to higher customer satisfaction.

BRIEF DESCRIPTION OF THE DRAWINGS

A more complete understanding of the present invention may be derived by referring to the detailed description when considered in connection with the Figures, where like reference numbers refer to similar elements throughout the Figures, and.

DETAILED DESCRIPTION

The following description is of exemplary embodiments of the invention only, and is not intended to limit the scope, applicability or configuration of the invention in any way. Rather, the following description is intended to provide a convenient illustration for implementing various embodiments of the invention. As will become apparent, various changes may be made in the function and arrangement of the elements described in these embodiments without departing from the scope of the invention.

Figure 1:
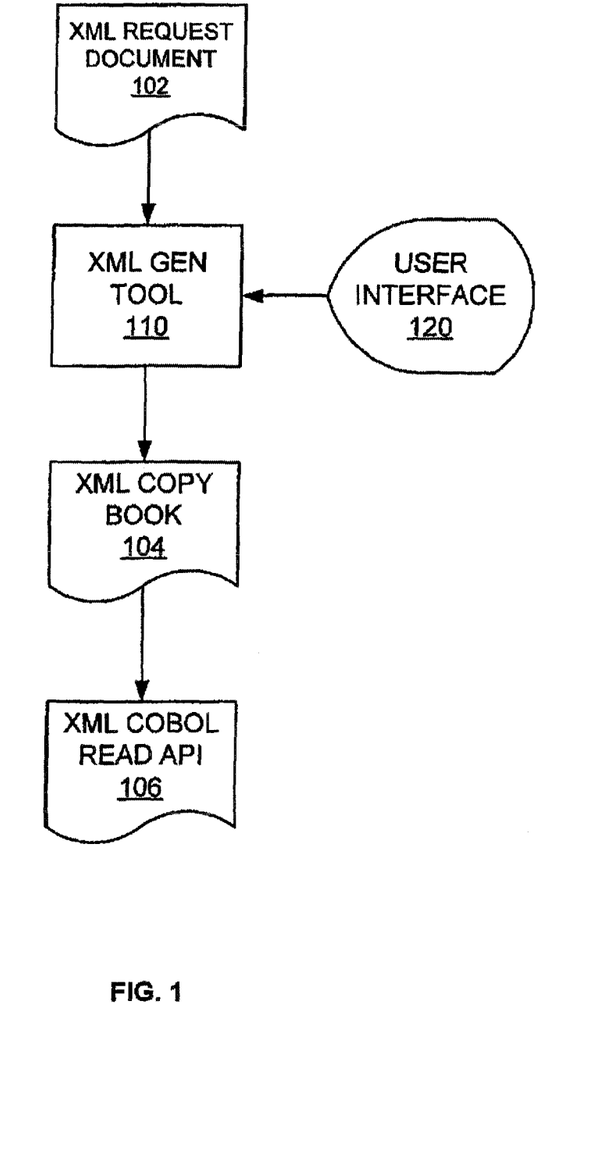
FIG. 1 is a schematic overview of an exemplary system in accordance with the present invention.

FIG. 1 shows an overview of an exemplary system in accordance with the invention. As shown, in an exemplary embodiment, an XML Request Document 102 is fed into an XML READ tool 110, which may be controlled via a suitable user interface 120. XML READ tool 110 then creates a suitable copy book 104, which is then used to create an XML COBOL application programming interface 106 (API) (or simply "program code") which may then be used to read XML documents corresponding in structure to that of document 102.

Figure 2:
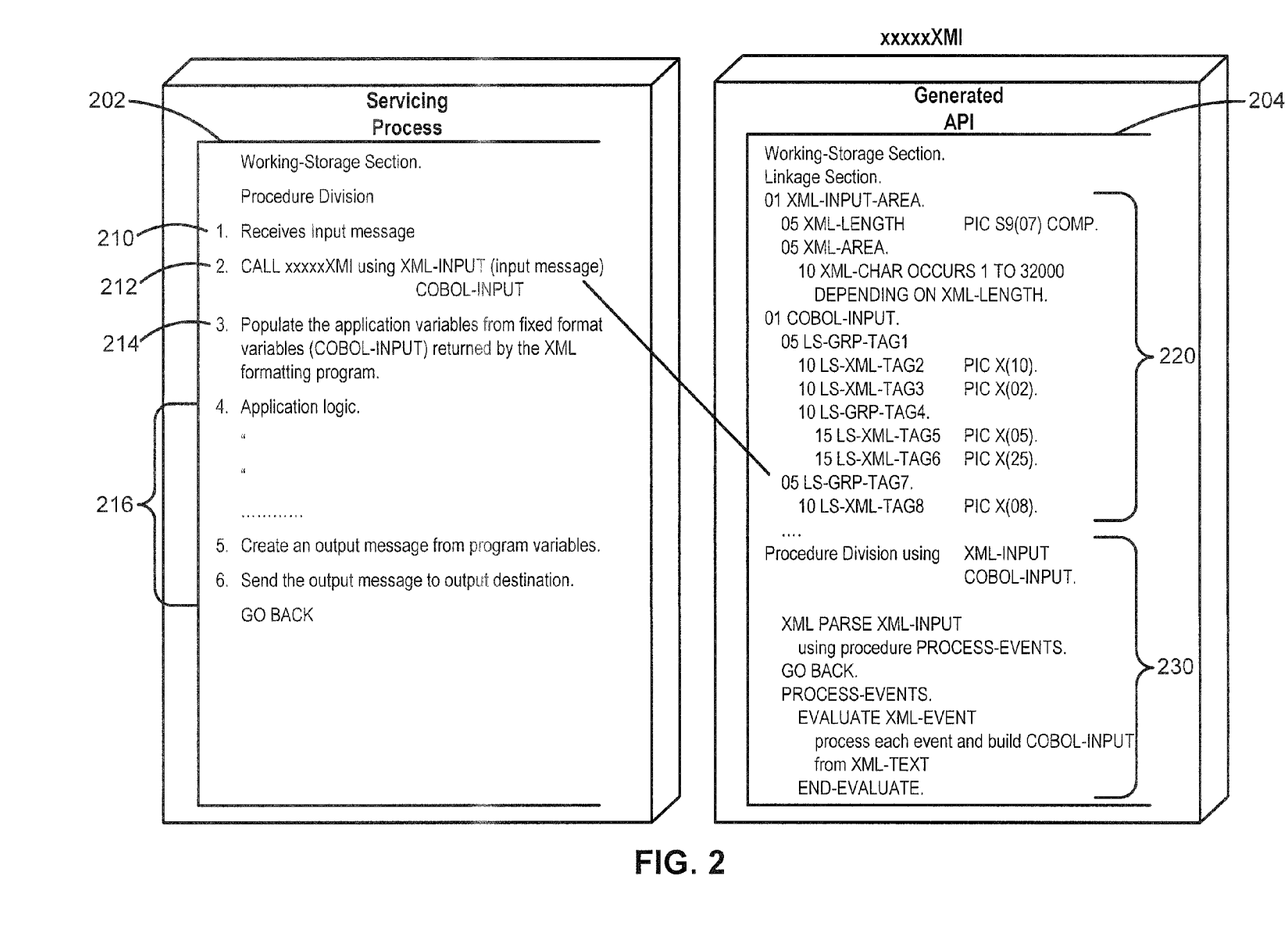
FIG. 2 illustrates exemplary run-time processing of an exemplary XML document.

FIG. 2 illustrates run-time processing of an exemplary XML document in accordance with the invention. As shown, during standard processing, the main procedure 202 receives an input message (210), then calls the appropriate XML code (API) 204 (Step 212), the creation process for which is covered in detail below. The API includes previously-created linkage section 220 and procedure division 230 used to convert the XML code into a COBOL data structure. The variables returned from API 204 are used to populate the application variables in main procedure 202 (Step 214). Processing then continues with application logic, creation of an output message, and sending of the output message to an output destination (216).

Figure 4:
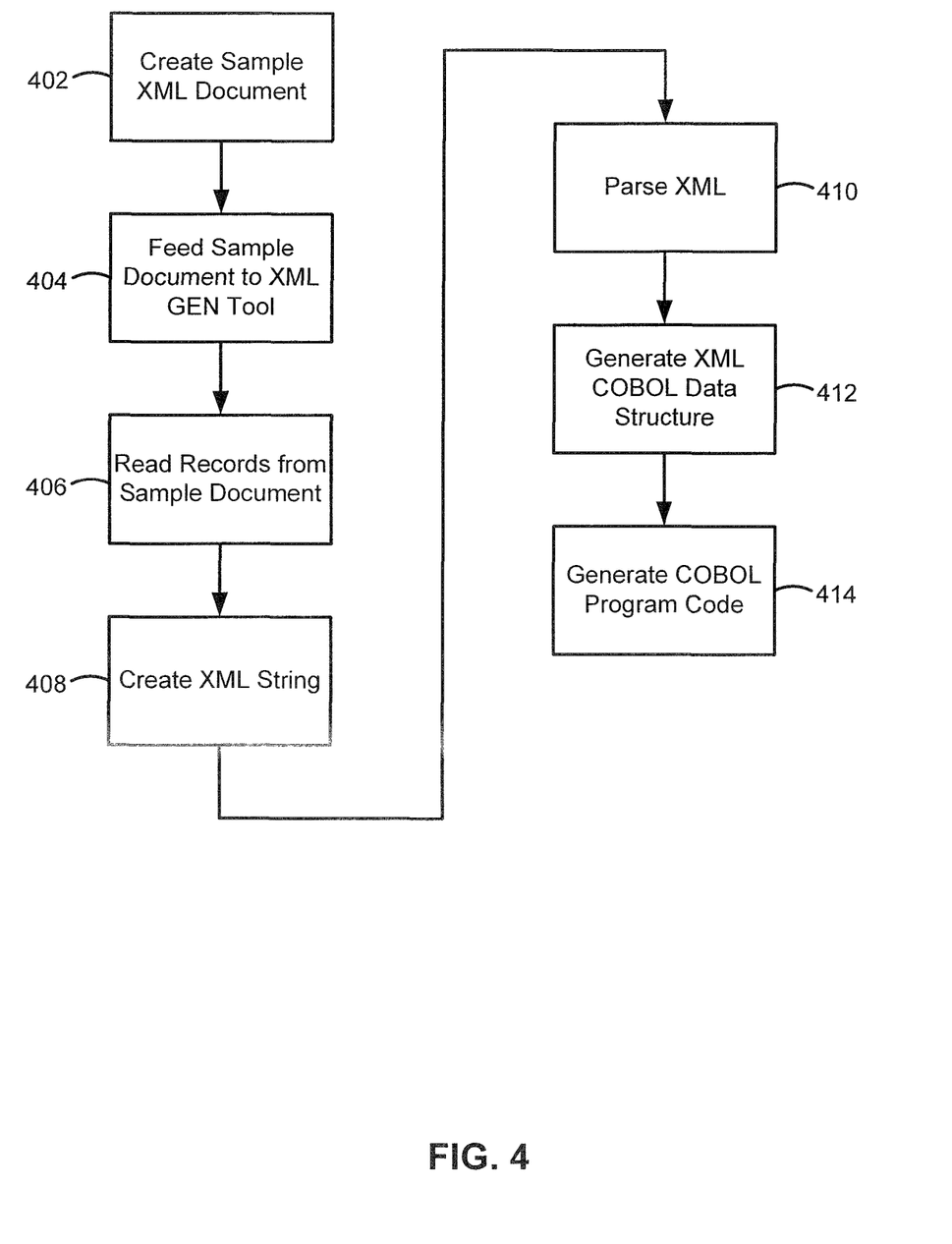
FIG. 4 is a flowchart depicting an exemplary method of generating COBOL code.

Referring now to FIG. 4, an exemplary method in accordance with the invention will now be described. Initially, in step 402, a template XML document is created which includes substantially all possible tags, both optional and mandatory, that are likely to be encountered in the particular context. The tags may be populated, for example, with sample values that represent the maximum length of the tag and may be repeated to represent multiple occurrences. Alternatively, using a user interface, the developer can adjust the field lengths and array sizes as desired. In the illustrated embodiment, the system uses the maximum lengths.

The various tags used in XML documents are known in the art, and are covered in a variety of language specifications and developer publications. See, e.g., Elliotte Harold, *XML: Extensible Markup Language* (IDG, 1998), which is hereby incorporated by reference.

Figure 3:
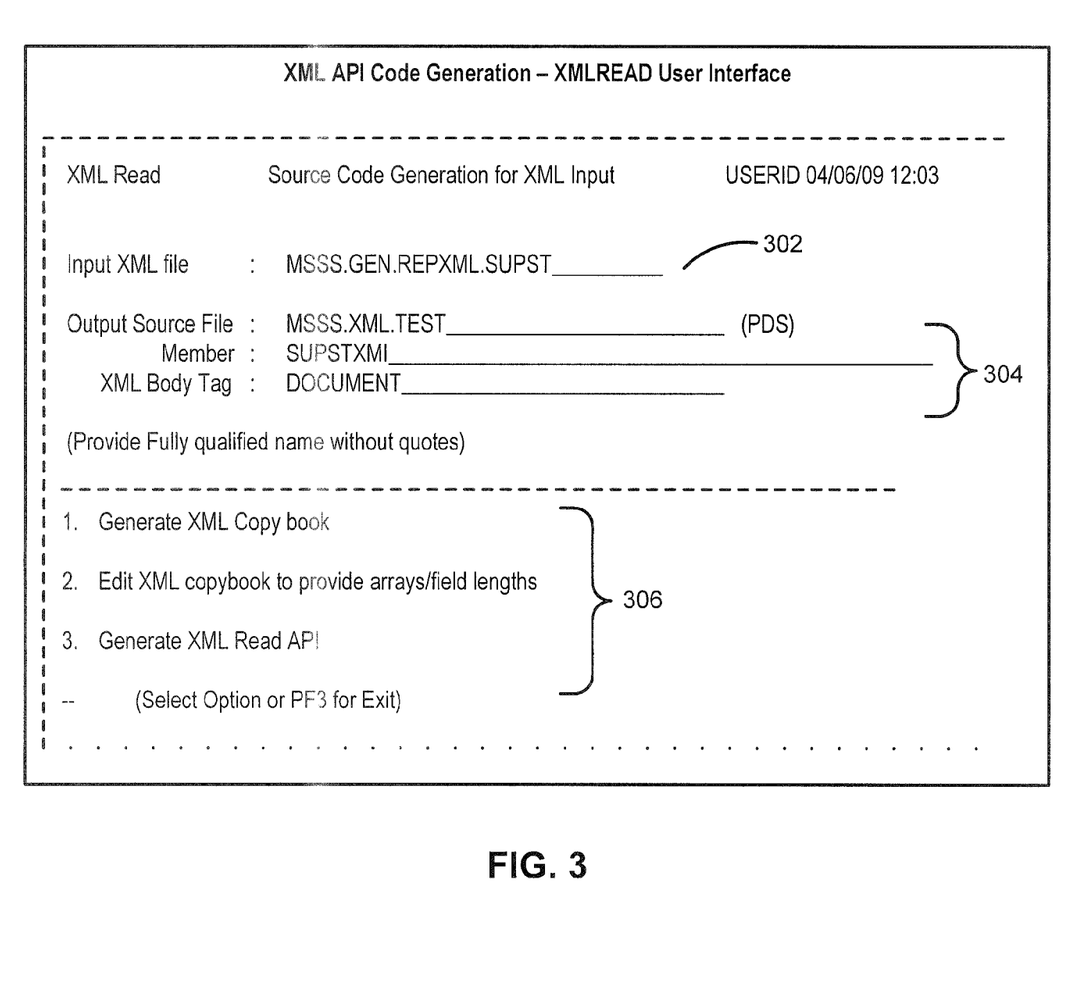
FIG. 3 illustrates an exemplary user interface.

With momentary reference to FIG. 3, a typical user interface may appear as shown, including a region 302 for selecting the appropriate XML file, a region 304 for specifying the name and attributes of the output source file, and various options 306 for generating and editing the appropriate copybooks and API code. It will be appreciated that a variety of user interfaces may be employed, and that the illustrated interface is not intended to be limiting.

Referring once again to FIG. 4, in step 404, the template XML document is fed through the XML READ tool. This may be completed, for example, via the user interface just described or any other appropriate interface, or may be completed automatically.

In steps 406-408, the system then reads records from the template XML document and creates a corresponding XML string. A suitable parsing statement is then used to parse the XML string, e.g., the IBM COBOL "XML Parse" statement. (step 410). For a description of the IBM COBOL "XML Parse" statement, see, e.g., IBM Enterprise COBOL Language Reference, Version 3, Release 3, Third Ed. (February 2004), which is hereby incorporated by reference.

Next, in step 412, the system intercepts the various XML events, and generates the XML COBOL data structure that is used in the linkage section as fixed format output. The various XML events that are intercepted are described in further detail below.

In step 414, the system generates suitable COBOL procedure division statements (e.g., program code) to extract each tag and attribute into fixed format layout. This may be completed, for example, using ISPF edit macros and static code snippets. With the program code generated in step 414, subsequent XML documents may be processed as described above in conjunction with FIG. 2.

Figure 6:
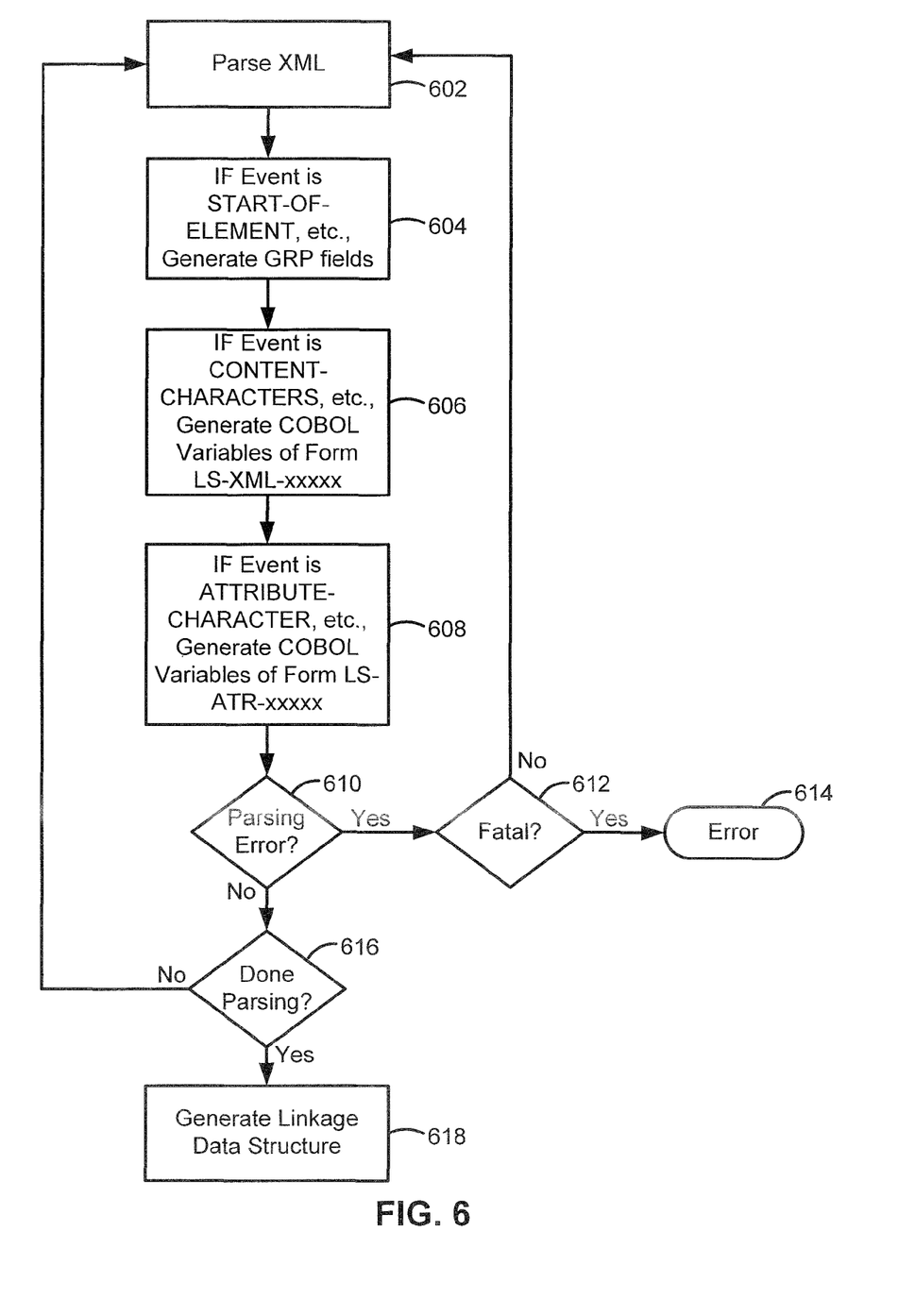
FIG. 6 is a flowchart depicting an exemplary parsing operation.

Having thus given on overview of the illustrated method, a detailed discussion of the various procedures will now be discussed. FIG. 6 illustrates an exemplary method of parsing the template XML document to create a suitable COBOL data structure (steps 410-412 in FIG. 4). As shown, the exemplary system, in steps 602-612, parses the XML by intercepting various XML events and generating the corresponding COBOL data structure to be used in the linkage section as fixed formal output.

The XML is suitably parsed (step 602). Each event of 'START-OF-ELEMENT', 'ATTRIBUTE-NAME', and the like generates a GRP-field that reflect the tag/attribute in fixed format data structure (step 604). Similarly, each event of 'CONTENT-CHARACTERS' and 'CONTENT-CHARACTER' generates a COBOL variable with appropriate length (step 606). The tags that have content are given variable names of 'LS-XML-xxxx' with appropriate length, wherein xxxx represents the tag name. Each event of 'ATTRIBUTE-CHARACTERS' and 'ATTRIBUTE-CHARACTER' generates a COBOL variable with a name of 'LS-ATR-xxxxx', where xxxx represents the attribute name (step 608).

With respect to the naming conventions described above, it will be appreciated that any suitable convention and combination of characters may be used, and that variable names given above are merely examples, and are in no way limiting.

If there is a parsing error during the previous steps (610), and the error is not fatal (612), the system loops back to step 602, and continues parsing until complete (616). In the case of a fatal error, a suitable error procedure is called (step 614). An example of a non-fatal error is where the XML error code is either between 49 and 100 or between 299 and 500.

Finally, in step 618, the system generates a Linkage data structure with the fields identified in steps 604, 606, and 608. In one embodiment, the data structure follows the same hierarchy as the XML document.

Figure 5:
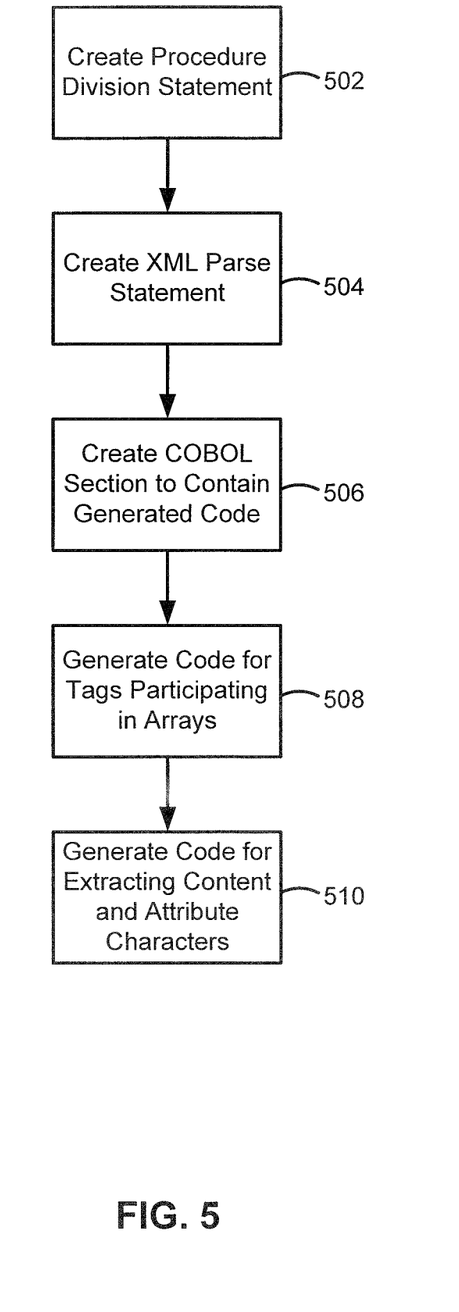
FIG. 5 is a flowchart depicting an exemplary method of generating a COBOL procedure division.
Figure 7:
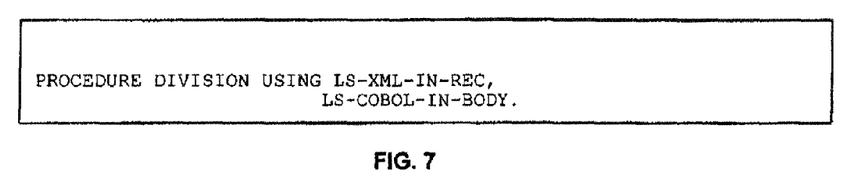
FIG. 7 shows exemplary COBOL procedure division code.

FIG. 5. illustrates an exemplary method of creating suitable COBOL program code (step 414 in FIG. 4). Initially, in step 502, the system creates a COBOL procedure division statement to accept a variable length XML document and return a fixed format data structure corresponding to the previously generated linkage data structure. An example procedure division statement is shown in FIG. 7.

Figure 8:
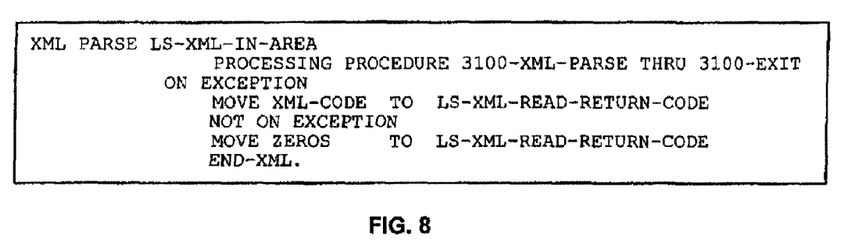
FIG. 8 shows an exemplary XML Parse statement.

Next, in step 504, the system creates a COBOL XML PARSE statement corresponding to the inputted XML document. FIG. 8 shows an example XML PARSE statement.

In step 506, the system creates a COBOL Section to contain the code that follows. This section preferably processes, for example, the following XML events: 'START-OF-ELEMENT', 'ATTRIBUTE-NAME', 'ATTRIBUTE-CHARACTERS', 'ATTRIBUTE-CHARACTER', 'END-OF-ELEMENT', 'CONTENT-CHARACTERS', and 'CONTENT-CHARACTER'

Figure 9:
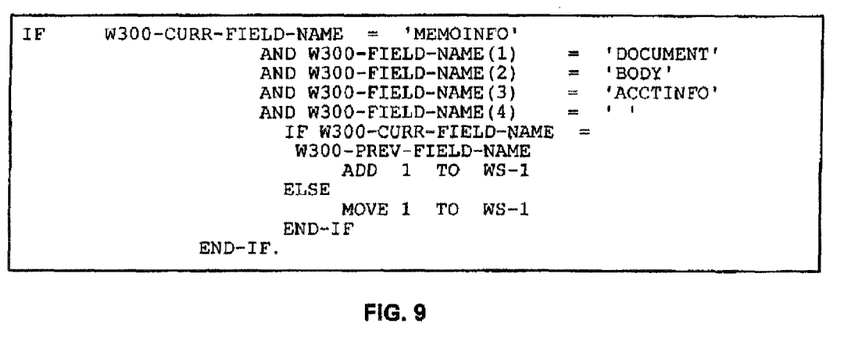
FIG. 9 shows exemplary COBOL generation code.

Next, in step 508, the system generates necessary code for each tag that participates in an array so that the appropriate indexes are maintained, allowing data to be moved to the corresponding occurrence. In one embodiment, the generated code is configured such that, each time a new element is started, the tag is evaluated to determine whether it participates in an array, and its dimension is appropriately updated. Similarly, the system generates appropriate code to decrement the dimension when an end-of-element occurs. An element or attribute name is identified by comparing the entire hierarchy of elements. FIG. 9 shows an example section of such code.

Figure 10:
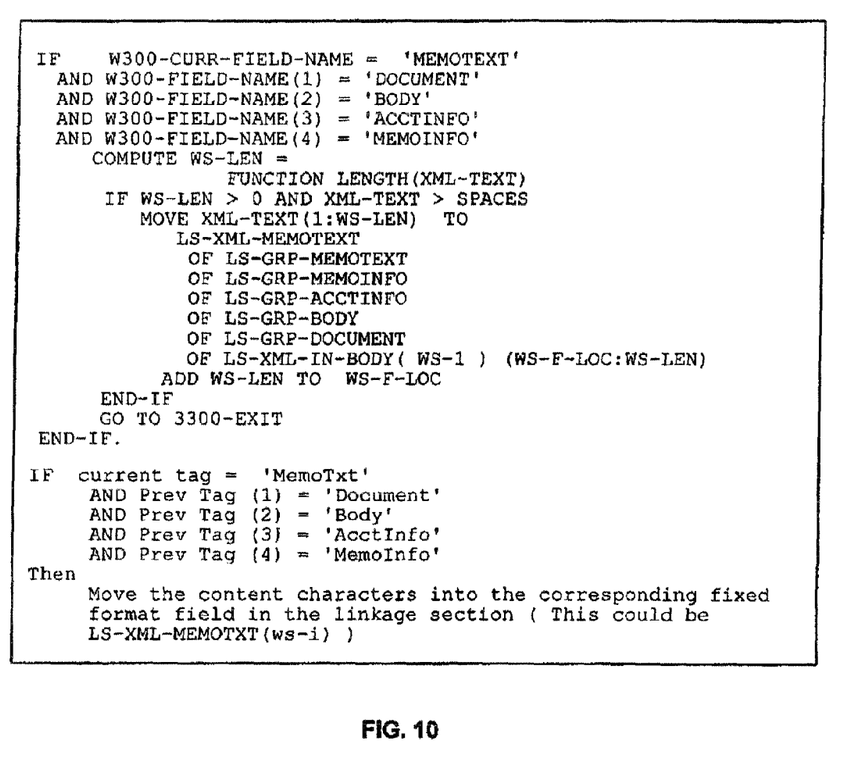
FIG. 10 shows exemplary COBOL generation code for extracting content and attribute characters.

In step 510, the system generates code configured to extract the content character(s) and attribute character(s) of an element or attribute. In the illustrated embodiment, this involves creating code comprising a series of 'if' conditions to trap the appropriate tag or attribute. An element or attribute name is then identified by comparing the entire hierarchy of elements/attributes. This is intended to eliminate any misinterpretation due to potential duplicate tag names in the XML. For instance, to uniquely identify the tag <MemoText>, in the template XML shown below, the tool will generate the example code shown in FIG. 10.

Figure 11:
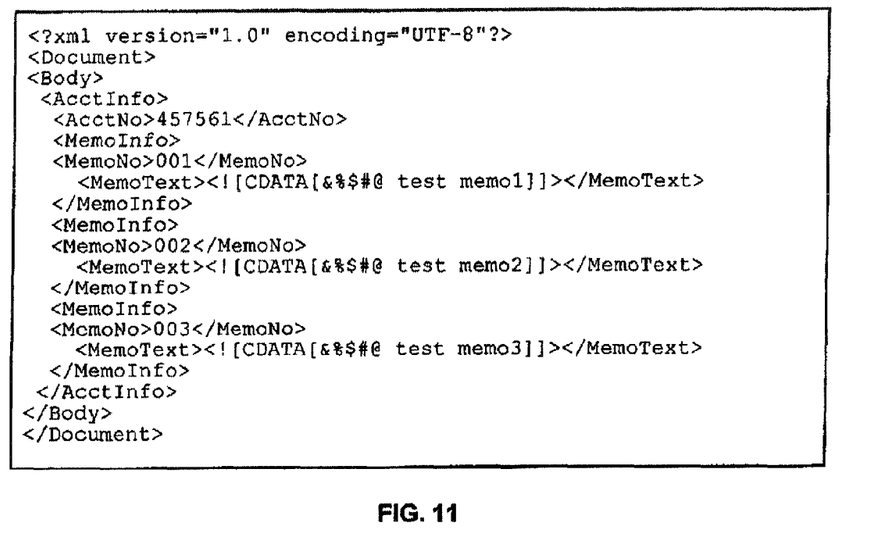
FIG. 11 shows an exemplary XML document.
Figure 12:
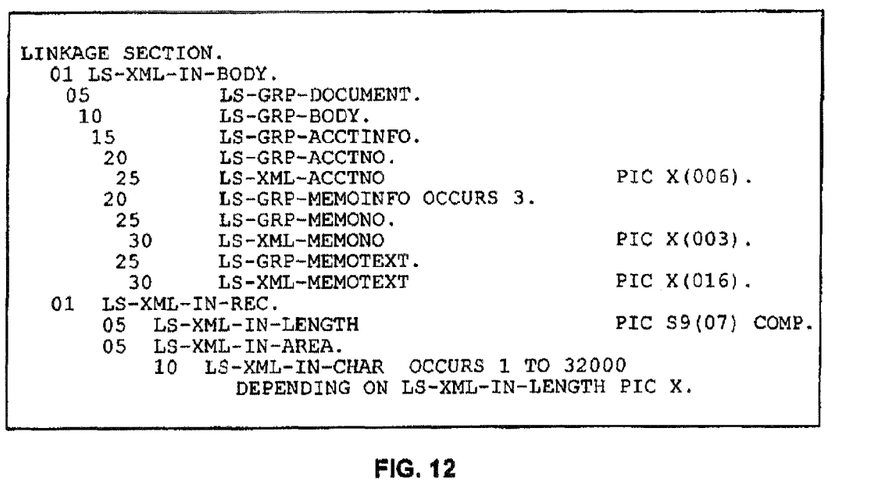
FIG. 12 shows an exemplary COBOL linkage section.
Figure 13A:
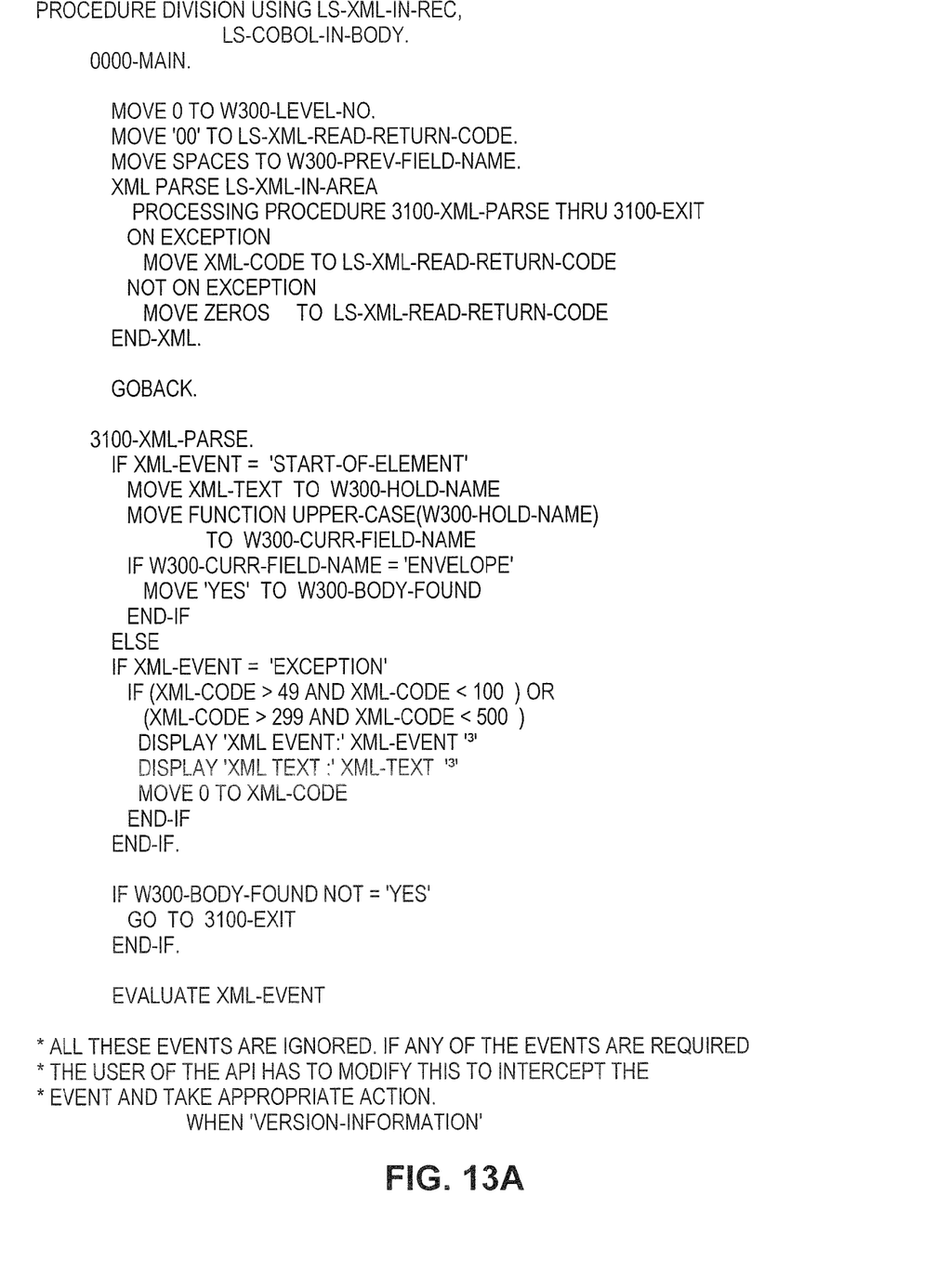
FIGS. 13A-13D show an exemplary COBOL procedure division for parsing XML documents such as that shown in FIG. 11 in conjunction with the linkage section shown in FIG. 12.
Figure 13B:
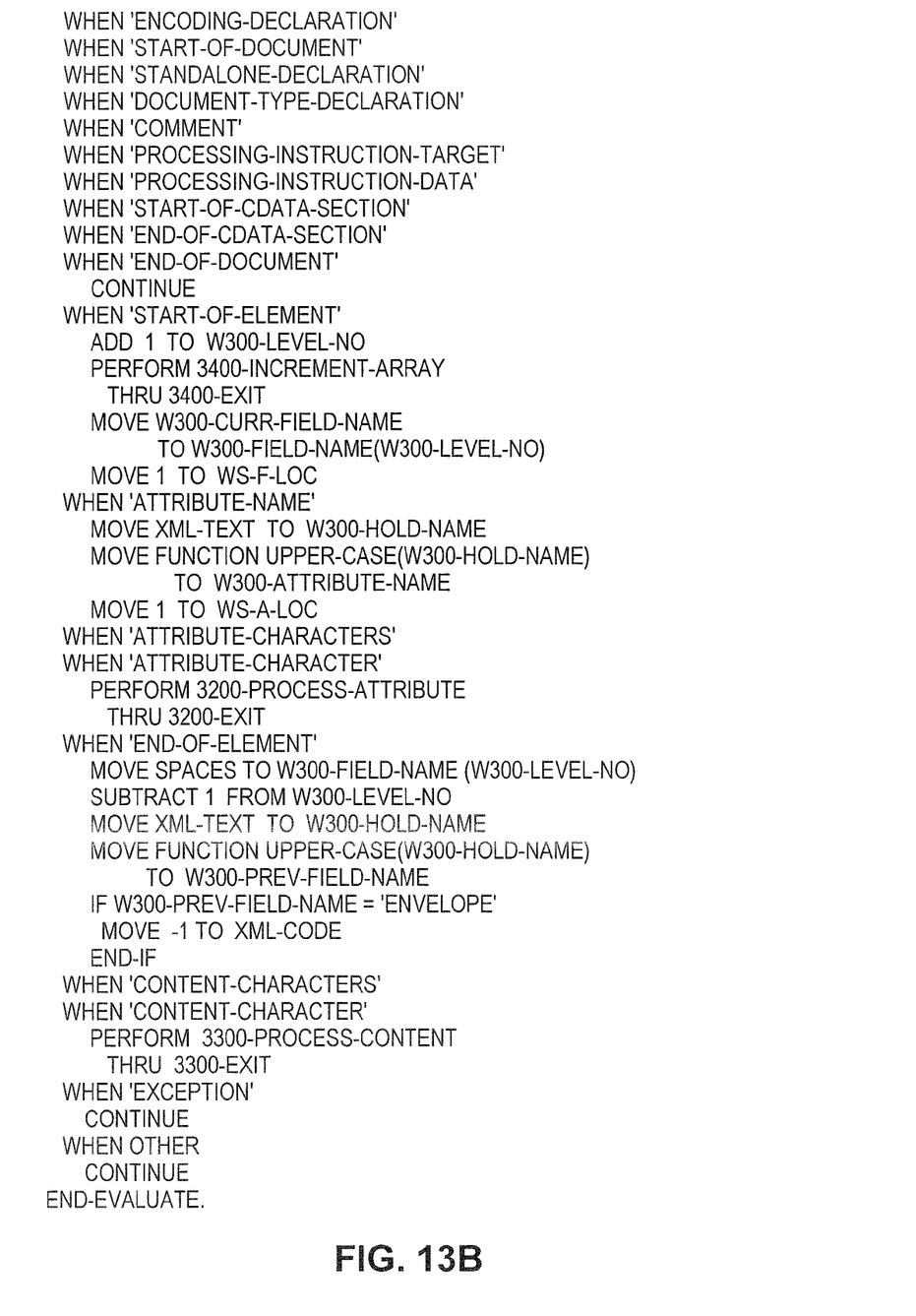
Figure 13C:
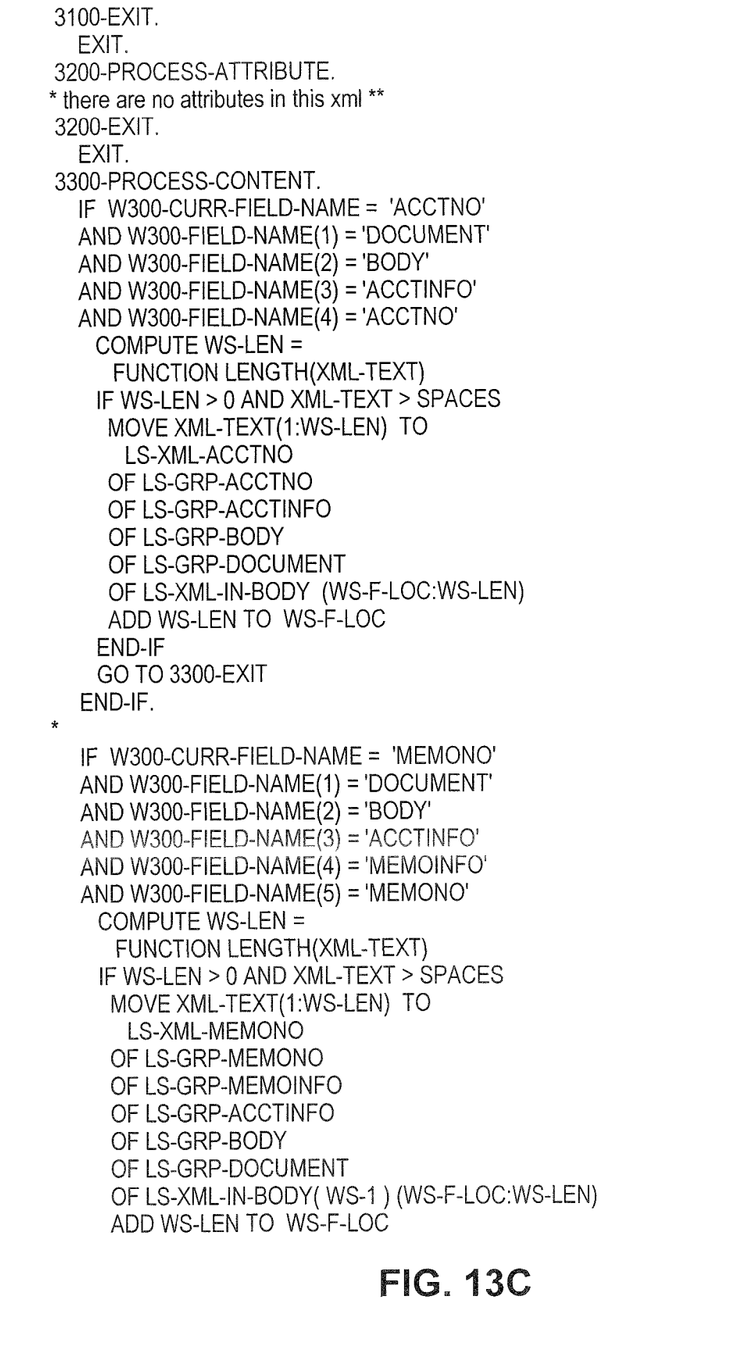
Figure 13D:
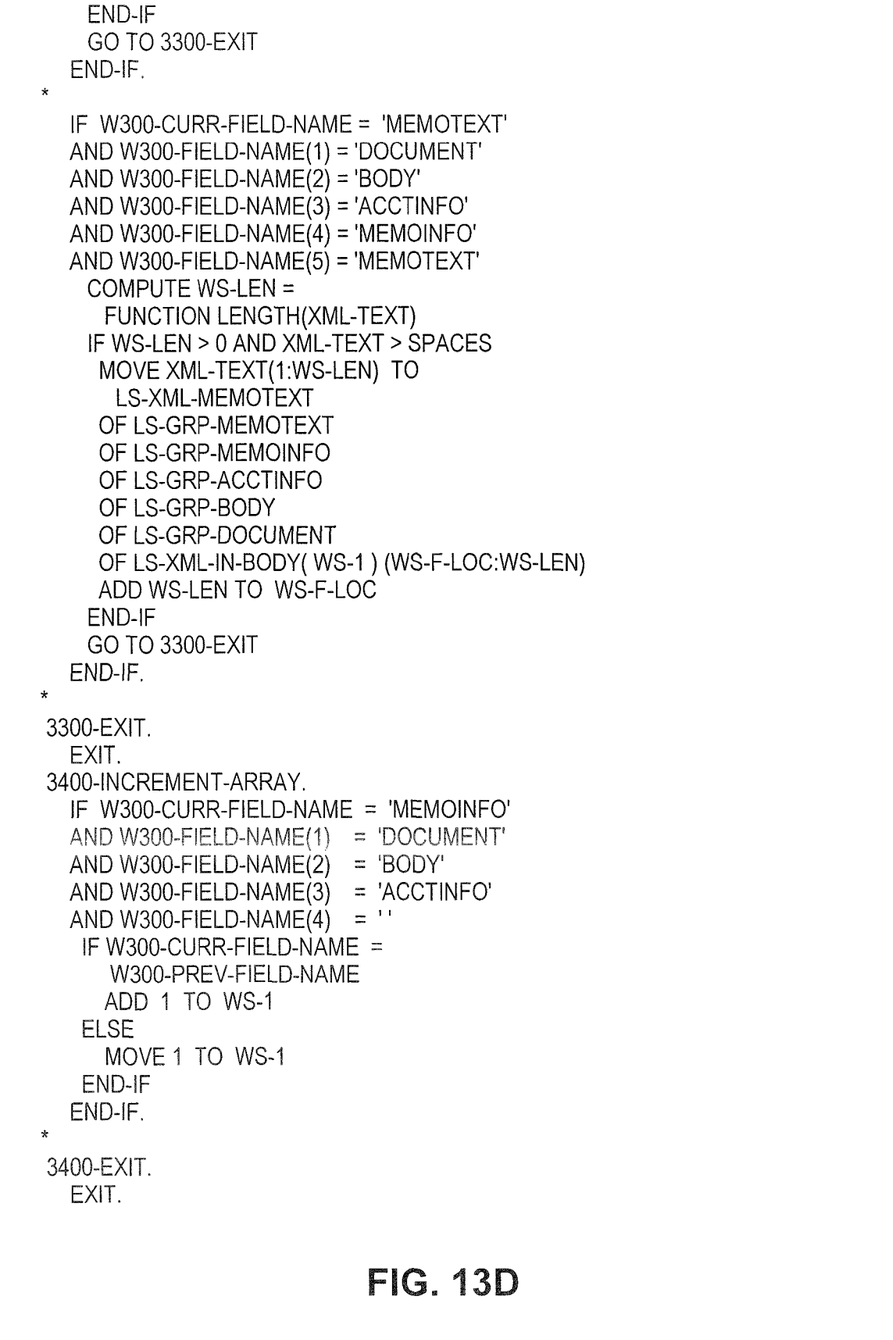

As a result of the process described above, the template XML document is used to produce corresponding COBOL code. In this regard, FIG. 11 shows an example printout of template XML being fed to the XML READ tool, while the corresponding COBOL data structure, including the linkage section, is shown in FIG. 12. The complete procedure division statements generated by the tool for the above XML are FIGS. 13A-13D.

As will be appreciated by one of ordinary skill in the art, the present invention may be embodied as a customization of an existing system, an add-on product, upgraded software, a stand alone system (e.g., kiosk), a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

For the sake of brevity, conventional data networking, application development and other functional aspects of the systems (and components of the individual operating components of the systems) may not have been described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system. The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the present invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. The computer may include any suitable personal computer, network computer, workstation, minicomputer, mainframe or the like. User computer can be in a home or business environment with access to a network. In an exemplary embodiment, access is through a network or the Internet through a commercially-available web-browser software package.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

Many of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like.

It should be understood that the detailed description and specific examples, indicating exemplary embodiments of the present invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

The invention claimed is:

1. A method comprising:
creating, by a computer-based system, a linkage data structure corresponding to a second programming language different from a markup language, wherein the linkage data structure includes a field for each tag in a set of tags associated with the markup language, wherein the set of tags is retrieved by parsing a document;
generating, by the computer-based system, program code in the second programming language based on the set of tags, wherein the generating comprises:
creating a procedure division statement in the second programming language;
wherein the procedure division statement is capable of accepting a document written in the markup language,
wherein the document is variable length, and
wherein the procedure division statement is capable of returning a fixed format data structure corresponding to the linkage data structure,
creating a second programming language section to contain the program code in the second programming language; and
producing, by the procedure division statement and the second programming language section, the program code in the second programming language,
wherein the program code is configured to extract, from the document written in the markup language, the set of tags associated with the markup language and at least one attribute associated with each tag;
forming, by the computer-based system, an application programming interface (API) that includes the linkage data structure and the program code; and
using, by the computer-based system, the application programming interface (API) to pass content from one or more documents written in the markup language to a program element of a program written in the second programming language.

2. The method of claim 1, further comprising creating, by the computer-based system, the document, wherein the document includes the set of tags.

3. The method of claim 1, further comprising creating, by the computer-based system, the document using the markup language.

4. The method of claim 1, wherein the set of tags are associated with the markup language.

5. The method of claim 1, further comprising parsing, by the computer-based system, the document to retrieve the set of tags.

6. The method of claim 1, wherein the markup language is XML and further comprising:
creating an XML parse statement; and
generating program code for XML tags participating in arrays.

7. The method of claim 1, wherein the second programming language is COBOL, and further comprising:
generating a plurality of COBOL fields responsive to parsing; and
generating a plurality of COBOL variables responsive to said parsing step.

8. The method of claim 1, wherein the markup language is XML.

9. The method of claim 1, wherein the second programming language is COBOL and the markup language is XML.

10. A system comprising:
a processor,
a tangible, non-transitory memory configured to communicate with the processor,
the tangible, non-transitory memory having instructions stored thereon that, in response to execution by the processor, cause the processor to perform operations comprising:
creating, by the processor, a linkage data structure corresponding to a second programming language different from a markup language, wherein the linkage data structure includes a field for each tag in a set of tags associated with the markup language, wherein the set of tags is retrieved by parsing a document;
generating, by the processor, program code in the second programming language based on the set of tags, wherein the generating comprises:
creating a procedure division statement in the second programming language;
wherein the procedure division statement is capable of accepting a document written in the markup language,
wherein the document is variable length, and
wherein the procedure division statement is capable of returning a fixed format data structure corresponding to the linkage data structure,
creating a second programming language section to contain the program code in the second programming language; and
producing, by the procedure division statement and the second programming language section, the program code in the second programming language,
wherein the program code is configured to extract, from the document written in the markup language, the set of tags associated with the markup language and at least one attribute associated with each tag;

forming, by the processor, an application programming interface (API) that includes the linkage data structure and the program code; and using, by the processor, the application programming interface (API) to pass content from one or more documents written in the markup language to a program element of a program written in the second programming language.

11. The system of claim 10, further comprising creating, by the processor, the document, wherein the document includes the set of tags.

12. The system of claim 10, further comprising creating, by the processor, the document using the markup language.

13. The system of claim 10, wherein the set of tags are associated with the markup language.

14. The system of claim 10, further comprising parsing, by the processor, the document to retrieve the set of tags.

15. The system of claim 10, wherein the markup language is XML and further comprising:

creating an XML parse statement; and generating program code for XML tags participating in arrays.

16. The system of claim 10, wherein the second programming language is COBOL, and further comprising:

generating a plurality of COBOL fields responsive to parsing; and generating a plurality of COBOL variables responsive to said parsing step.

17. The system of claim 10, wherein the markup language is XML.

18. The system of claim 10, wherein the second programming language is COBOL and the markup language is XML.

19. An article of manufacture including a non-transitory, tangible computer readable storage medium having instructions stored thereon that, in response to execution by a computer-based system, cause the computer-based system to perform operations comprising:

creating, by the computer-based system, a linkage data structure corresponding to a second programming language different from a markup language, wherein the linkage data structure includes a field for each tag in a set of tags associated with the markup language, wherein the set of tags is retrieved by parsing a document;

generating, by the computer-based system, program code in the second programming language based on the set of tags, wherein the generating comprises:

creating a procedure division statement in the second programming language;

wherein the procedure division statement is capable of accepting a document written in the markup language, wherein the document is variable length, and wherein the procedure division statement is capable of returning a fixed format data structure corresponding to the linkage data structure, creating a second programming language section to contain the program code in the second programming language; and producing, by the procedure division statement and the second programming language section, the program code in the second programming language, wherein the program code is configured to extract, from the document written in the markup language, the set of tags associated with the markup language and at least one attribute associated with each tag;

forming, by the computer-based system, an application programming interface (API) that includes the linkage data structure and the program code; and using, by the computer-based system, the application programming interface (API) to pass content from one or more documents written in the markup language to a program element of a program written in the second programming language.

* * * * *